Figure 1:
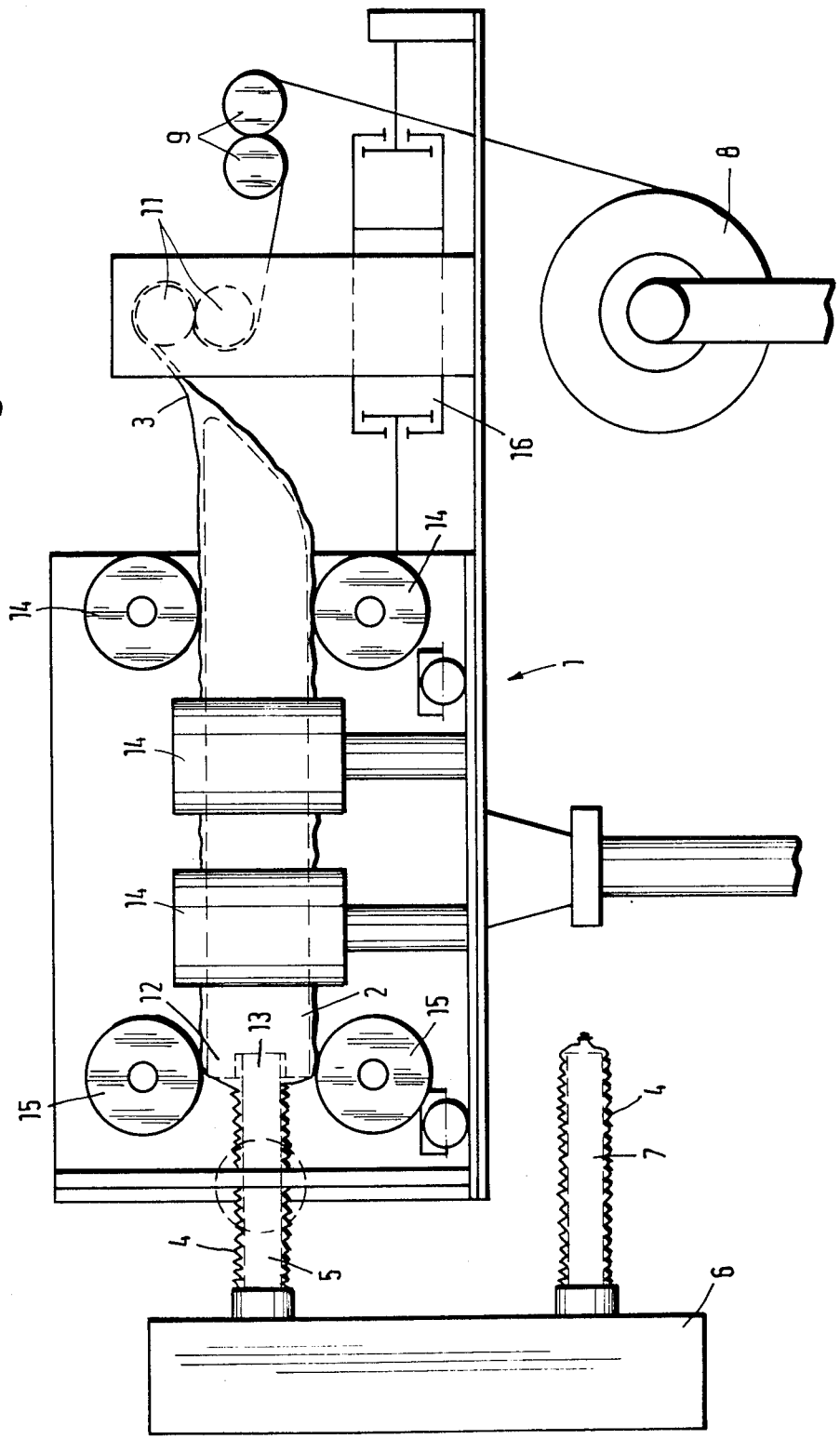

United States Patent [19]

Niedecker

[11] Patent Number: 4,619,018

[45] Date of Patent: Oct. 28, 1986

[54] APPARATUS FOR APPLYING A LENGTH OF FLEXIBLE TUBING TO THE FILLING PIPE OF A MULTIPLE-SPOUT HEAD

[76] Inventor: Herbert Niedecker, Am Ellerhang 6, 6240 Konigstein, Taunus, Fed. Rep. of Germany

[21] Appl. No.: 562,491

[22] Filed: Dec. 16, 1983

[30] Foreign Application Priority Data

Dec. 16, 1982 [DE] Fed. Rep. of Germany ....... 3246639

[51] Int. Cl.[4] ........................ A22C 11/12; A22C 13/02
[52] U.S. Cl. ............................................. 17/33; 17/41
[58] Field of Search ............... 17/33, 34, 35, 36, 41, 17/42, 49, 1 R; 53/138 R, 567, 574, 576

[56] References Cited

U.S. PATENT DOCUMENTS

| | | | |
|---|---|---|---|
| 1,616,971 | 2/1927 | Henderson | 17/49 X |
| 3,115,700 | 12/1963 | Marbach | 17/41 X |
| 4,358,873 | 11/1982 | Kollross | 17/41 X |

Primary Examiner—Robert L. Spruill
Assistant Examiner—Cynthia A. Collins
Attorney, Agent, or Firm—Sprung Horn Kramer & Woods

[57] ABSTRACT

To apply a length of flexible tubing to the filling pipe 5 of a multiple-spout head 6 for making a casing section 4, which is closed at one end and is to be processed further on a combined filling and closing machine, a carrying element 2 having a tubular end portion 12 is used, which is carried by a tubing feeder 1 operated to feed the tubing 3, which has been withdrawn from a roll 8 of tubing. To apply the length of tubing to the filling pipe, the carrying element 2 is moved axially into engagement with the end portion 13 of the filling pipe. Gripping elements 19 are provided to retain the length of tubing on the carrying element 2. The tubular end portion 12 of the carrying element 2 is designed so that it surrounds the end portion 13 of the filling pipe when the carrying element has been axially moved toward the filling pipe, and that the tubular end portion 12 of the filling element has one or more notches 18, through which one or more gripping elements 19 can be pivotally moved to retain the tubing 3 on the end portion 13 of the filling pipe. Feed rollers held against rotation are used as gripping elements to retain the tubing 3 on the tubular end portion 12 of the carrying element 2. The center lines of said feed rollers 15 lie approximately in the same plane as the points at which the gripping elements 19 engage the end portion 13 of the filling pipe.

3 Claims, 8 Drawing Figures

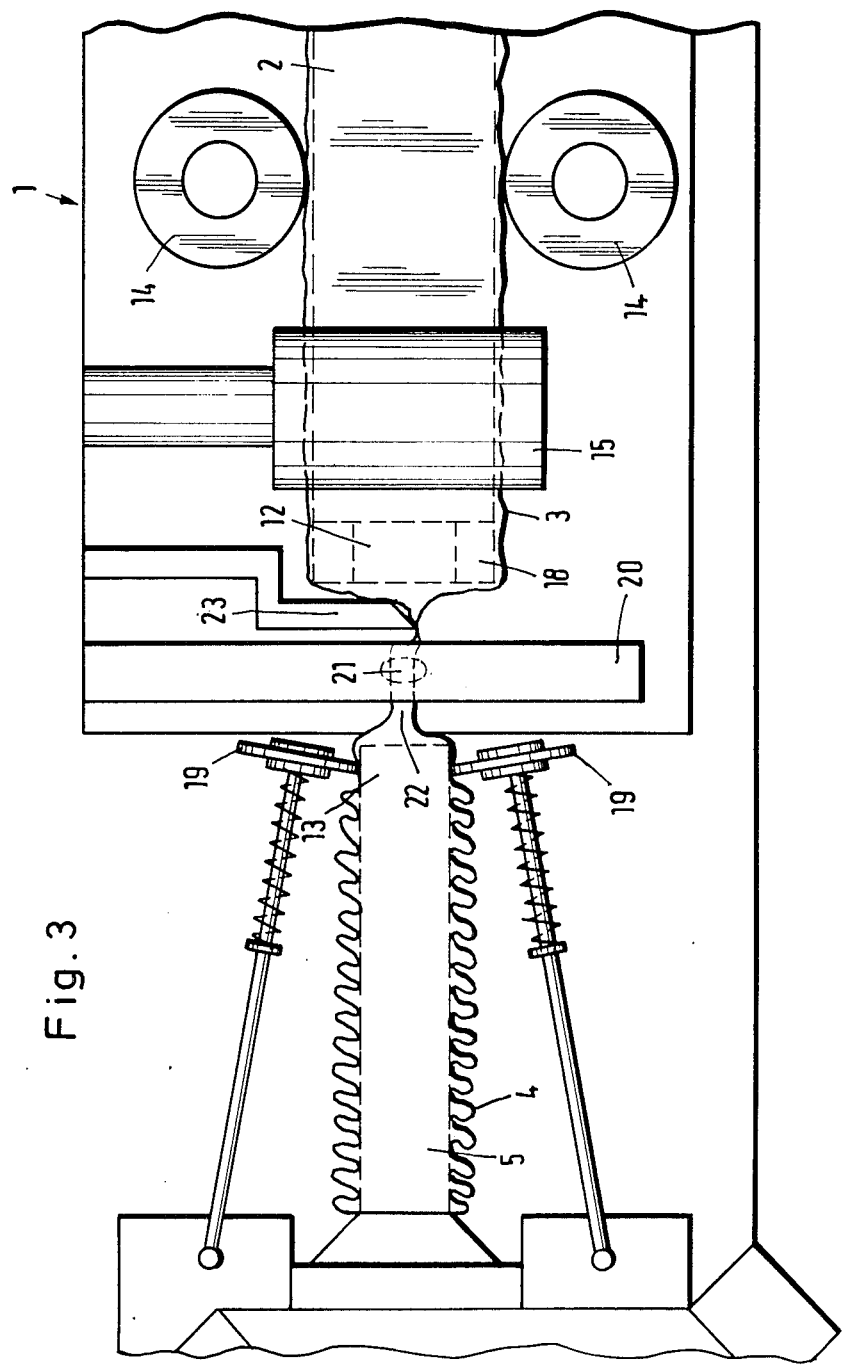

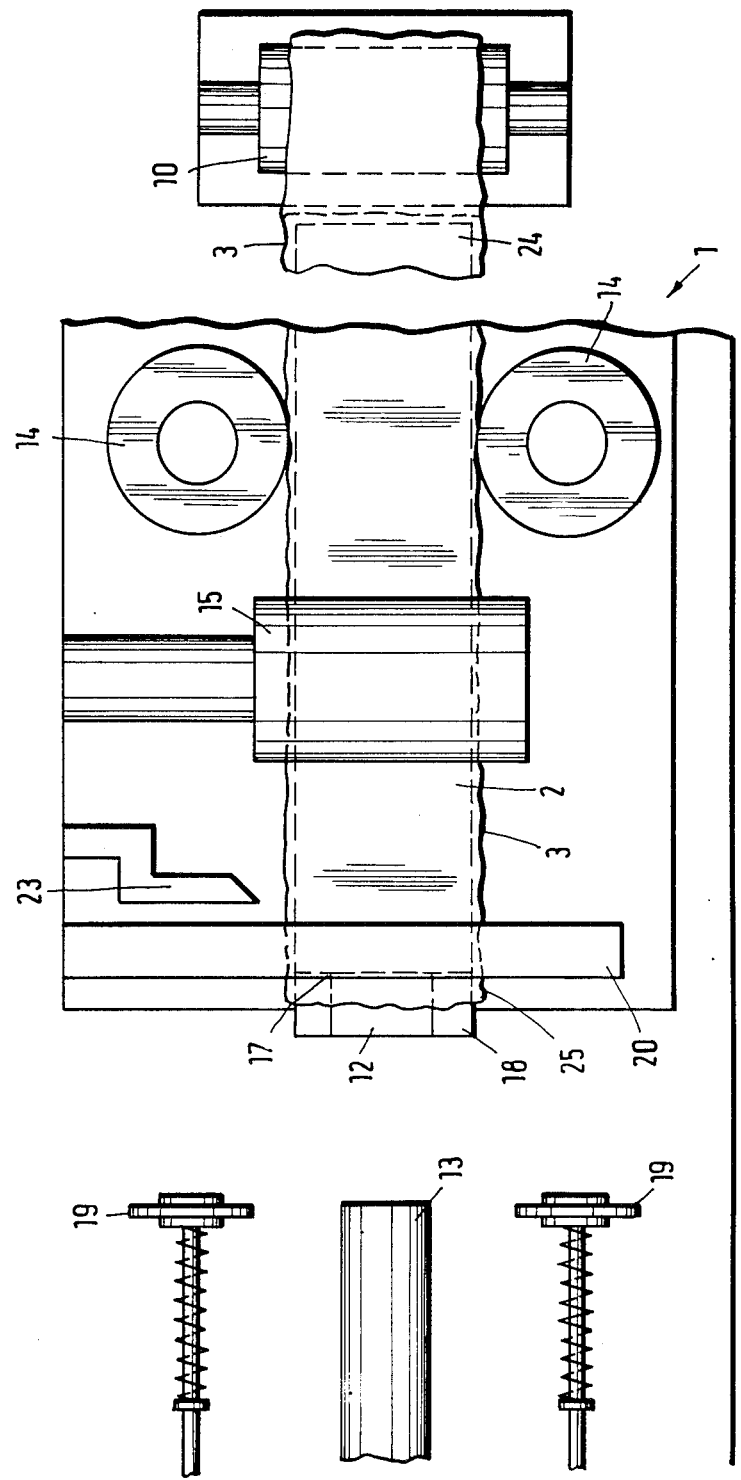

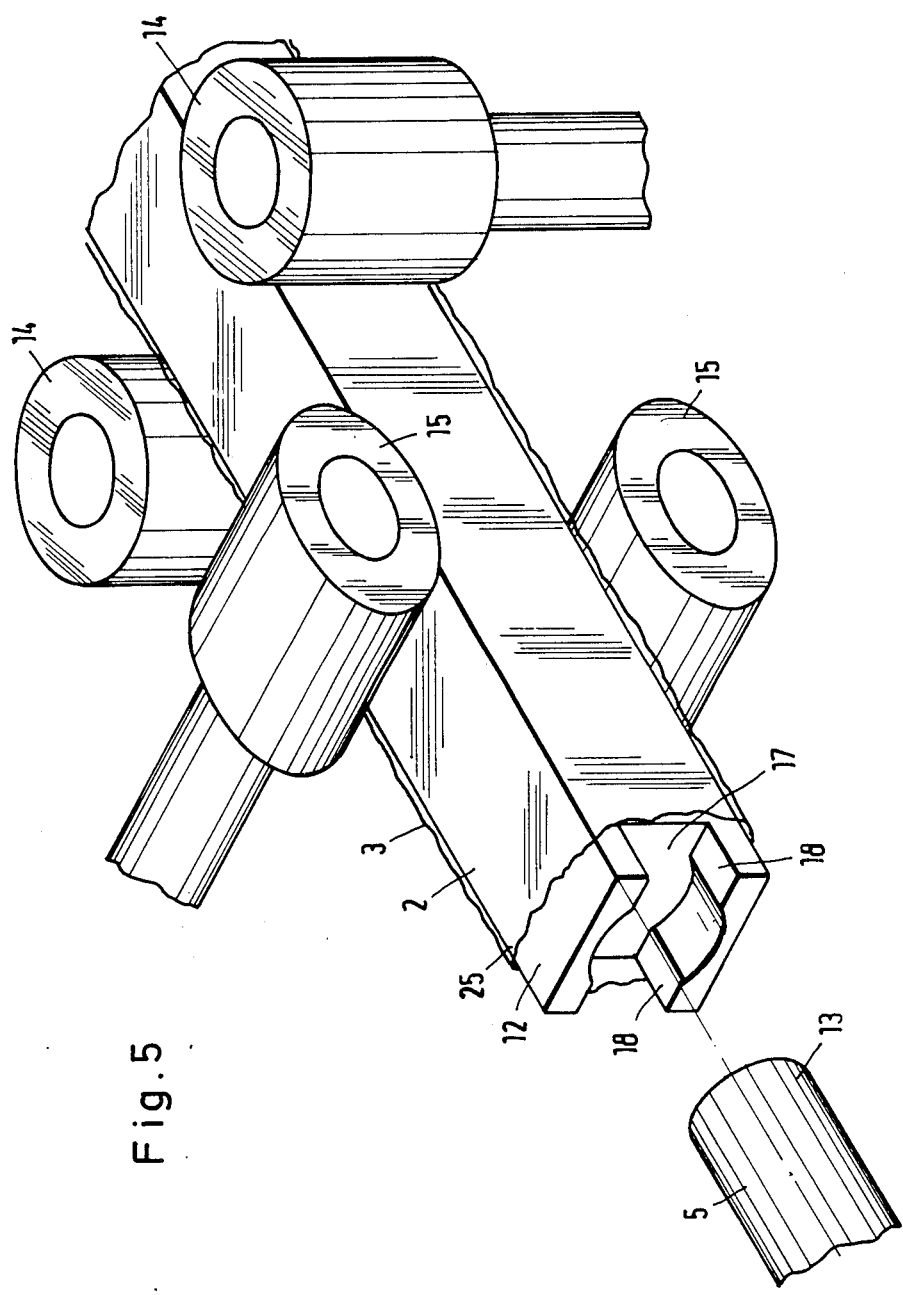

APPARATUS FOR APPLYING A LENGTH OF FLEXIBLE TUBING TO THE FILLING PIPE OF A MULTIPLE-SPOUT HEAD

This invention relates to apparatus for applying a length of flexible tubing to the filling pipe of a multiple-spout head for making a casing section which is closed at one end and is to be processed further on a combined filling and closing machine.

In apparatus of the above-mentioned kind which is known from Laid-open German Application No. 29 41 872, corresponding to U.S. Pat. No. 358,873, a tubing feeder comprising a floating gathering tube, which has a conical end portion, is moved in a centering operation into engagement with an also conical end portion of the filling pipe. The feeder then moves the tubing from a roll of tubing over the gathering tube and causes the tubing to be gathered to a bellow-like formation on the filling pipe. After the gathering operation, the end of the bellows is retained on the gathering tube by gripping jaws and the gathering tube is then moved away from the end of the filling pipe. Thereafter, a closing element is applied around the bellows between the end of the filling pipe and the gathering tube, and the bellows is severed from the flexible tubing by a cutting device. That apparatus has the disadvantage that the tubing portion to be closed is not tightly stretched when the closing clip is being applied so that it is not sufficiently reliably ensured that the closing clip will exactly centrally constrict the tubing to form a tail. Besides, it is not ensured that the tubing end portion disposed on the gathering tube will be opened in a controlled manner with adequate reliability for the application to the next following filling pipe so that a clamping of the tubing end portion during the movement of the gathering tube into engagement with the end of the filling pipe will be prevented.

It is also known from Laid-open German Application No. 31 06 074, corresponding to U.S. application Ser. No. 438,447, filed Nov. 2, 1982, now abandoned, to provide a carrying sleeve for applying casing sections, which are ready to be filled, to the filling pipe, and to use that carrying sleeve for pushing the casing section onto the filling pipe and for retaining the end portion of the tubing on the filling pipe, whereafter the carrying sleeve is retracted so that that end portion of the tubing section which is disposed in front of the filling pipe can be closed and cut off. In that operation the carrying sleeve provided with the casing section moves onto the filling pipe throughout the length of the casing section and gripping means and the stroke of the feeder must be properly adjusted. This requires a relatively large stroke of the carrying sleeve.

It is an object of the invention to provide apparatus which is of the kind described first hereinbefore and in which the distances to be travelled by the tubing between the tubing feeder and the filling pipe are relatively short and the length of tubing to be closed is tightly stretched during the closing operation. This object is accomplished in accordance with the invention in that in such apparatus, which also comprises a carrying element, which has a tubular end portion and is held by a tubing feeder for moving the tubing withdrawn from a roll of tubing and is axially moved into engagement with the end portion of the filling pipe to receive and at least partly cover the end portion of the filling pipe when the length of tubing is to be applied to the filling pipe, gripping means for retaining the length of tubing on the carrying element and/or the filling pipe are provided, the tubular end portion of the carrying element has in accordance with the invention one or more notches, one or more gripping elements are provided, which are pivotally movable through said notches to retain the tubing on the end portion of the filling pipe when the carrying element has been axially moved into engagement with said end portion of the filling pipe, whereas feed rollers are provided and are held against rotation to serve as gripping elements for retaining the tubing on the tubular end portion of the carrying element and the center lines of said feed rollers are approximately disposed in the same plane as the gripping points at which the gripping elements engage the end portion of the filling pipe. The center lines and the gripping points may be offset about 20 mm. If two notches are formed in the tubular and portion of the carrying element, two mutually opposite, concave inside surfaces will be formed, which may overlap the end portion of the filling pipe.

The advantage afforded by the apparatus according to the invention resides in that the tubular end portion of the carrying element surrounds the end portion of the filling pipe and that the notches in the tubular end portion of the carrying element permit the tubing to be held by the gripping elements against the end portion of the filling pipe while the tubing is held at the same time against the end portion of the carrying element by the feed rollers, which are held against rotation. Because the gripping points lie approximately in a plane, the ungripped portion of the tubing will be tightly stretched when the feeder has been retracted by a short stroke from the filling pipe so that the tubing portion to be closed can be constricted to form a tail which is centered on the axis of the filling pipe and the clip which closes the tubing section will be centered on the axis of the filling pipe. Thereafter the tubing section is severed from the tubing. This is necessary to ensure that during the filling of that previously closed tubing end portion the closed tail can be centered as it is moved through the casing snubber. Besides, short displacements of the moved masses are sufficient for the feeding and subsequent closing of the tubing.

When the closing operation has been terminated, the still open end of the roll of tubing must be in such a position that it can be pushed over the end of the filling pipe without difficulty for the next cycle of operations. This is ensured in that the tubular end portion of the carrying element protrudes from the end portion of the tubing. For this purpose, the feeder performs a further retracting stroke while the carrying element engages a stop.

Because the friction between the inside surface of the tubing and the carrying element must be less than the friction between the outside surface of the tubing and the feed rollers, the materials of the carrying element and of the feed rollers must be properly selected.

For instance, the carrying element may carry coverings of polytetrafluoroethylene (Teflon) and the feed rollers may carry coverings of rubber, leather or cork.

According to a preferred further feature of the invention, the carrying element may be non-circular in cross-section and may be provided at least adjacent to the feed rollers with surfaces which are non-circular in cross-section and engageable by the feed rollers. In that case the entire carrying element may be rectangular in cross-section. With a carrying element of that design, a single carrying element of a given size can be used to process tubings having sizes within a range that is larger than the range of tubing sizes which can be processed by means of a given carrying element which is circular in cross-section and feed rollers conforming thereto. If a circular carrying element is used, the processing of tubing having a slightly different size will require a replacement of the carrying element and of the feed rollers.

The apparatus according to the invention can be used to process lengths of tubing which constitute only one section for a single sausage and are formed with an end closure after the filling operation. Alternatively, the apparatus according to the invention may be used to process lengths of tubing from which a string of sausages or individual sausages can be made.

Figure 2:
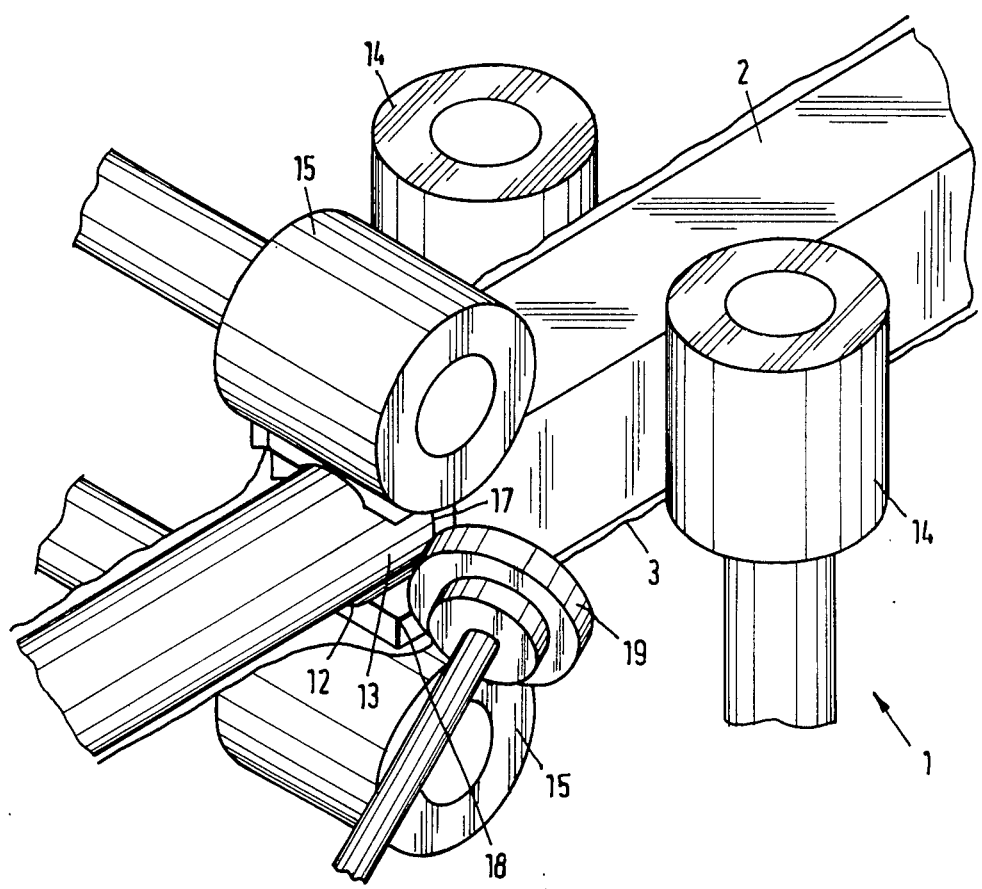
Figure 6A:
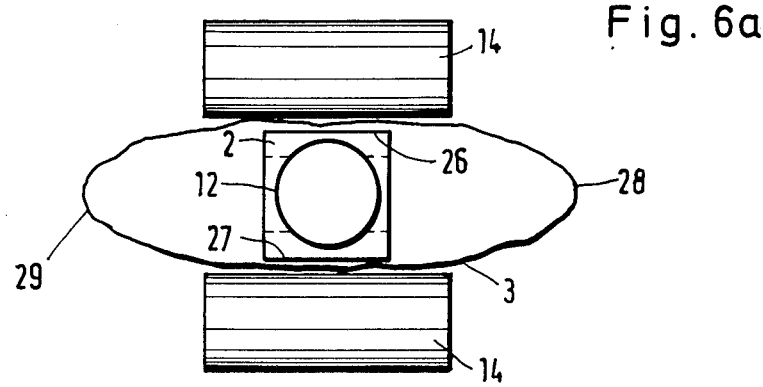
Figure 6B:
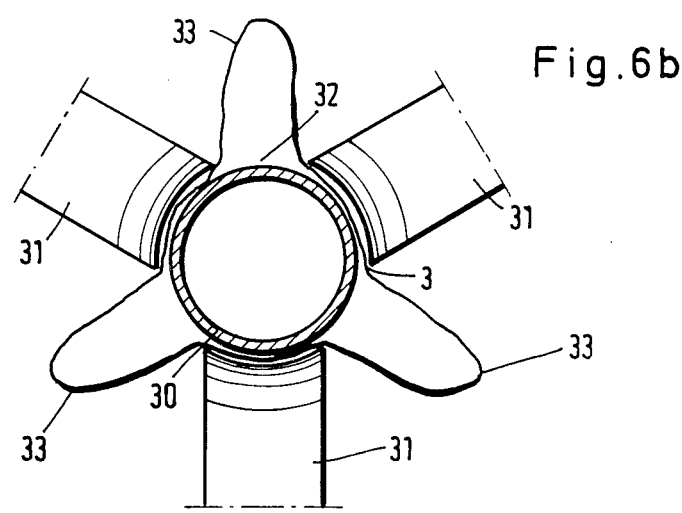
Figure 6C:
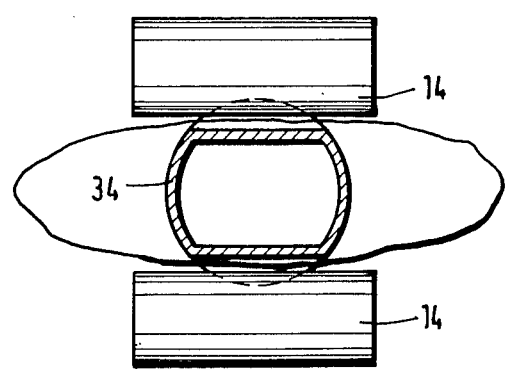

Further details of the invention become apparent from the following description and the drawings, in which FIG. 1 is a side elevation showing the tubing feeder and the carrying element according to the invention, FIG. 2 is a perspective view showing the tubular end portion of the carrying element, which end portion has been axially moved over the end portion of the filling pipe and is provided with notches, and also shows a gripping element, which lies approximately in the same plane as the feed rollers, FIG. 3 is a top plan view showing that portion of the of the tubing where the latter is closed and severed and also shows the carrying element in a retracted position and the filling pipe, which has received the tubing section, and the gripping elements pivotally moved into engagement with the filling pipe, FIG. 4 is a top plan view showing the apparatus with the entirely retracted feeder and with the carrying element protruding from the open tubing and engaging a stop roller, FIG. 5 is a perspective view showing the carrying element having a tubular end portion and notches for receiving pivoted gripping elements, and FIGS. 6a to 6c show carrying elements having different cross-sectional shapes.

FIG. 1 is a side elevation showing the tubing feeder 1 provided with the carrying element 2, which is provided in accordance with the invention and over which a flexible tubing 3 is pushed onto a filling pipe 5 to form a tubing section 4. The filling pipe 5 is mounted on a turret-like multiple-spout head 6 of a filling machine, which is not shown. The multiple-spout head 6 may be provided with at least one additional filling pipe 7, which has the same length and carries a previously closed tubing section 4. The tubing 3 is withdrawn in known manner from a supply roll 8 of tubing by withdrawing rollers 9 and measuring rollers 11 and is pulled over the carrying element 2, which has a tubular end portion 12, which surrounds the end portion 13 of the filling pipe so that the formation of the tubing section 4 on the filling pipe 5 will not be disturbed. By the feed rollers 14 and 15, the length of tubing required to form the desired tubing section is pushed onto the filling pipe 5. The tubing feeder 1 is axially moved, e.g., by a multi-position pneumatic cylinder 16, from the position shown in FIG. 1 to the closing position shown in FIG. 3 and to a tubing re-opening position shown in FIG. 4.

FIG. 2 is a perspective view showing just as FIG. 1 the carrying element in position for applying the tubing. The carrying element has been displaced axially in the filling direction so that the tubular end portion 12 of the carrying element 2 surrounds the end portion 13 of the filling pipe and the latter engages a stop formed by a surface 17 which constitutes the bottom of the notches 18 formed in the carrying element 2.

A gripping element 19 extends through the notch 18 in the carrying element 2 and retains the tubing 3 on the end portion 13 of the filling pipe. The feed rollers 15 serve as gripping elements, which urge the tubing 3 against the tubular end portion 12 of the carrying element 2. It is also apparent that the horizontal axes of the feed rollers 15, which bear on the tubular end portion 12 of the carrying element 2, and the gripping element 19, which retains the tubing 3 on the end portion 13 of the filling pipe, are disposed approximately in the same plane. As a result, as shown in FIG. 3, the tubing feeder 1 together with the carrying element 2 can be axially retracted relative to the non-rotating feed rollers 15 so that the tubing section 4 which is retained on the end portion 13 of the filling pipe by the gripping elements 19 will be tightly stretched in that region after a short retracting stroke. This ensures that the tubing sections 4 to be closed have exactly the desired length and the closing device 20 can apply the closing element 21 so that it will be centered on the axis of the filling pipe.

FIG. 3 is a top plan view showing the tail 22 of the tubing 3 and showing the carrying element 2 in a retracted position, also the filling pipe 5 and two gripping elements 19 which have been swung into engagement with the end portion 13 of the filling pipe and retain the tubing section 4 on the end portion 13 of the filling pipe. A closing device 20 is operated to apply a closing element 21. As a result, that portion of the tubing 3 which is closed is constricted to form a tail 22, which is centered on the axis of the filling pipe. A cutting device 23 is operated to sever the tubing section 4 from the tubing 3. When the tubing section 4 is held only by one unilaterally acting gripping element 19 (FIG. 2), then the closing device 20 must be adjusted to ensure that the tubing section 4 is nevertheless closed at a central point.

FIG. 4 is a top plan view showing the apparatus when the feeder 1 has been entirely retracted. The conical end portion 24 (see FIG. 1) of the carrying element 2 has been moved against the stop 10 and with its tubular end portion 12 has opened the tubing at its cut off end 25. The gripping elements 19 have been swung off the end portion 13 of the filling pipe. When the stop surface 17 of the carrying element 2 has been moved axially into engagement with the end portion 13 of the filling pipe during the next cycle of operations, the feed rollers 14 and 15 can move the next tubing section 4 onto the filling pipe 5 without an obstruction by the end portion 13 of the filling tube.

FIG. 5 is a perspective view showing a carrying element 2 which is rectangular in cross-section, for instance, and also shows the tubular end portion 12 of the carrying element 2 and the notches 18 formed therein. The gripping elements 19 shown in FIGS. 2 and 3 can extend through said notches to retain the tubing 3 on the end portion 13 of the filling tube. The tubular end portion 12 of the carrying element 2 contains a surface 17, which constitutes the bottom of the notches 18 and also constitutes a stop for engagement by the end face of the end portion 13 of the filling pipe when the carrying element 2 is axially advanced.

FIG. 6a shows a preferred rectangular cross-sectional shape of the carrying element 2. In that case, a single carrying element 2 may be used to process tubings 3 having sizes in a large range. The feed rollers 14 engage only two mutually opposite surfaces 26 and 27. Even if the tubing is much larger than corresponds to the carrying element 2, the tubing 3 can yield at 28 and 29 and its application to the filling pipe 5 will not be disturbed.

FIG. 6b shows the cross-section of a known, tubular carrying element 30. The feed rollers 31 conform in usual manner to the peripheral surface 32 of the tube so that the tubing 3 will be properly carried along. If in such an arrangement an excessively large tubing emerges at 33 between the feed rollers 31, this may interfere with the application of the tubing 3 to the filling pipe 5. In that embodiment the carrying element 30 should approximately match the size of the tubing so that the feed rollers 31 can operate without interference.

FIG. 6c shows another possible cross-sectional shape of the carrying element 34. This embodiment affords the same advantages as the carrying element 2 shown in FIG. 6a.

I claim:

1. In an apparatus for applying a length of flexible tubing to the filling pipe of a multiple-spout head for making a casing section which is closed at one end and is to be processed further on a combined filling and closing machine, which apparatus also comprises a carrying element, which has a tubular end portion and is held by a tubing feeder for moving the tubing withdrawn from a roll of tubing and is axially moved into engagement with the end portion of the filling pipe to receive and at least partly cover the end portion of the filling pipe when the length of tubing is to be applied to the filling pipe, wherein gripping means for retaining the length of tubing on the carrying element and/or the filling pipe are provided, the improvement wherein the tubular end portion of the carrying element includes one or more notches, the apparatus further including one or more gripping elements which are pivotally movable through said notches to retain the tubing on the end portion of the filling pipe when the carrying element has been axially moved into engagement with said end portion of the filling pipe, and feed rollers held against rotation to grip and retain the tubing on the tubular end portion of the carrying element, the center lines of said feed rollers being approximately disposed in the same plane as the gripping points at which the gripping elements engage the end portion of the filling pipe.

2. An apparatus according to claim 1, including means for axially retracting the tubing feeder together with the carrying element, and wherein before the retraction of the tubing feeder has been terminated the carrying element being arrested by a stop in a position in which the tubular end portion of the carrying element protrudes from the end of the tubing.

3. An apparatus according to claim 1, wherein at least adjacent to the feed rollers the carrying element has surfaces which are non-circular in cross-section and are engageable by said feed rollers.

* * * * *